ANTHONY SAN MIGUEL
ROBERT H. SILVER
INVENTORS

BY

ATTORNEYS

Sept. 20, 1966 JAMES E. WEBB 3,273,381
ADMINISTRATOR OF THE NATIONAL AERONAUTICS
AND SPACE ADMINISTRATION
MEANS AND METHOD OF MEASURING VISCOELASTIC STRAIN
Filed Jan. 8, 1964 3 Sheets-Sheet 3

ANTHONY SAN MIGUEL
ROBERT H. SILVER
INVENTORS

BY *[signature]*

ATTORNEYS

United States Patent Office 3,273,381
Patented Sept. 20, 1966

3,273,381
MEANS AND METHOD OF MEASURING
VISCOELASTIC STRAIN
James E. Webb, Administrator of the National Aeronautics and Space Administration, with respect to an invention of Anthony San Miguel and Robert H. Silver
Filed Jan. 8, 1964, Ser. No. 336,608
8 Claims. (Cl. 73—88)

This invention relates to means and method of measuring viscoelastic strain, and included in the objects of this invention are:

First, to provide a means and method wherein the isoclinic positions (0 to 90 degrees) are photographed in a short time interval thus enabling one to attain strain and stress measurements as a function of time, sometimes referred to as viscoelasticity.

Second, to provide a means and method of measuring viscoelastic strain in solid propellants wherein the principal direction and magnitude of strains are measured as a function of time and are recorded by the isoclinics and isochromatics as defined in classical photoelasticity, in a manner so as to provide full information regarding the properties of the propellant member.

Third, to provide a means and method wherein the viscoelastic properties of propellant as well as other materials can be measured under relaxation and creep conditions, or dynamic conditions, both cyclical and transitory, such as those experienced by operational solid rockets.

Fourth, to provide a means and method whereby experimental observations prerequisite to the fields of photothermoelasticity and photoviscoelasticity may be readily made; it being recognized that a knowledge of these fields is essential to the study of rocket propellant properties during cure and operational thermal cycling.

Fifth, to provide a means and method of measuring viscoelastic strain, which is nondestructive in nature, so that after test the propellant may be installed in a rocket motor for use; or the propellant of a rocket motor subject to a long storage period may be tested from time-to-time to insure that it is operational at the time of use.

Sixth, to provide a means and method wherein a tubular solid propellant member is coated with a photoelastic material, internally pressurized, and the resulting strain patterns at an end of the propellant are photographed for analysis.

Seventh, to provide a means and method wherein the strain patterns are photographed in polarized light, and in rapid succession under different conditions of pressure or orientation of the polarized light, or both, to provide full information regarding the properties of the solid propellant member.

With the above and other objects in view, as may appear hereinafter, reference is directed to the accompanying drawings in which.

Figure 1:
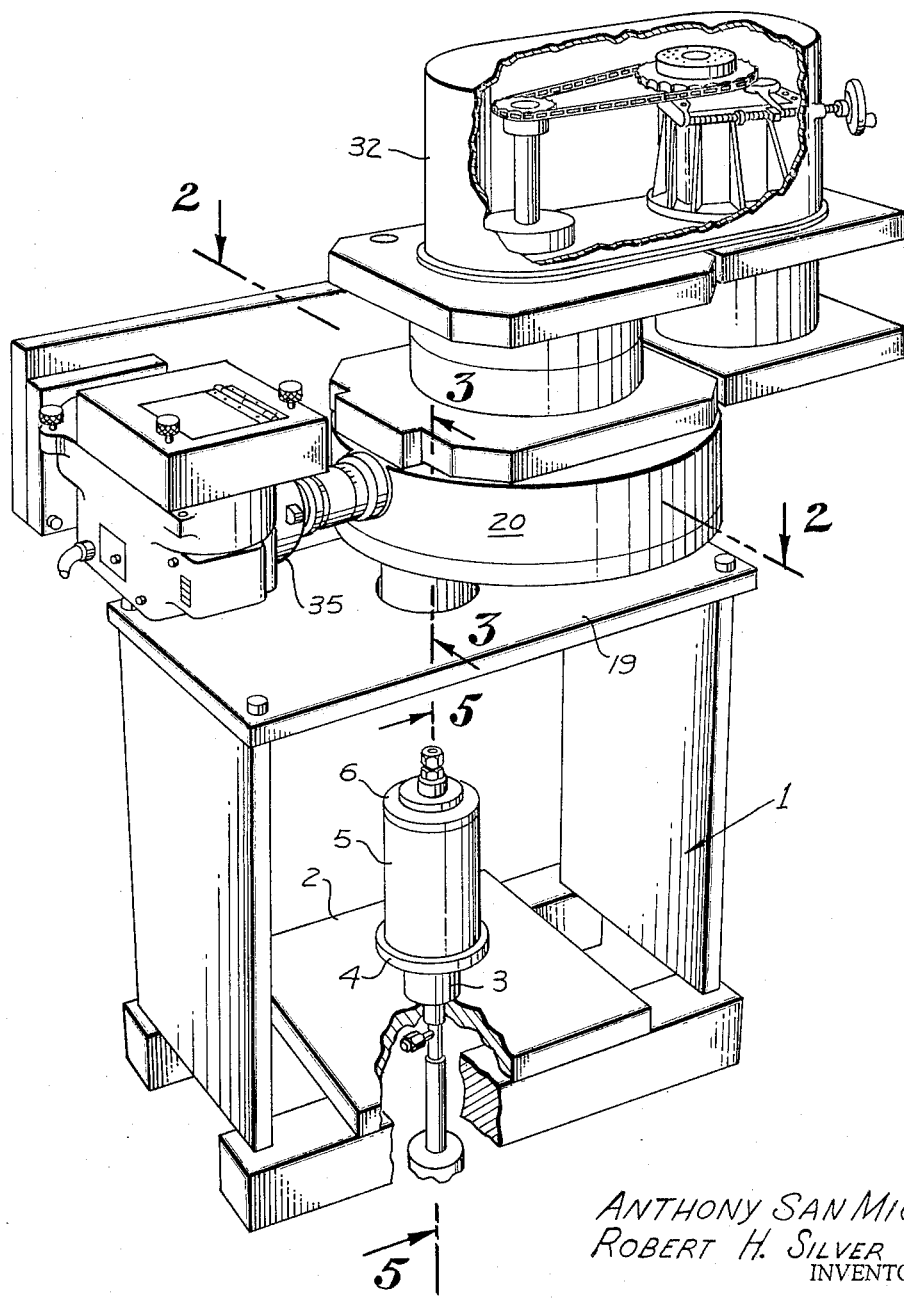
FIG. 1 is a perspective view with portions broken away illustrating the means for strain-analyzing solid propellants.
Figure 2:
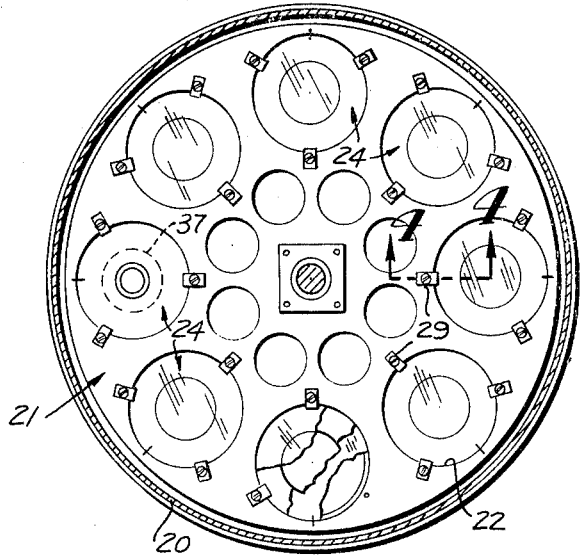
FIG. 2 is an enlarged, fragmentary, sectional view taken through 2—2 of FIG. 1 showing the filter turntable.
Figure 3:
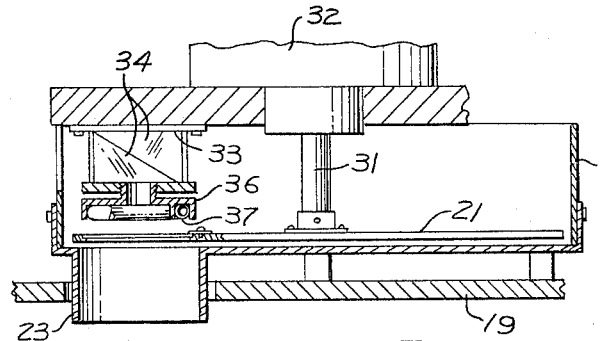
FIG. 3 is an enlarged, fragmentary, sectional view taken through 3—3 of FIG. 1.
Figure 5:
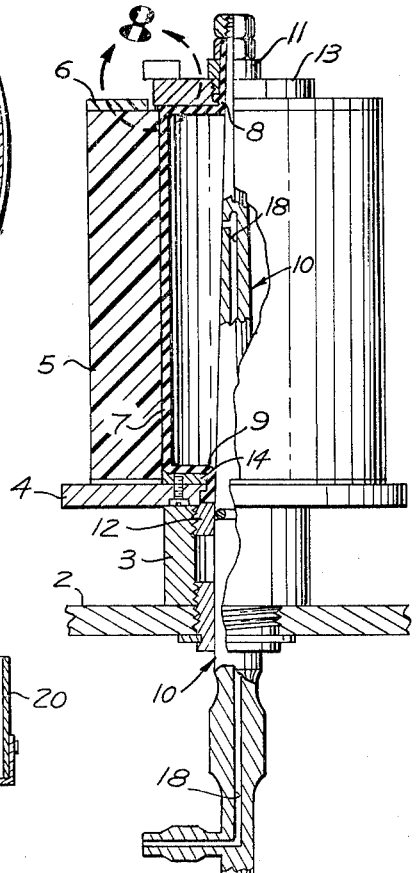
FIG. 5 is an enlarged, fragmentary, sectional view taken through 5—5 of FIG. 1 showing particularly the propellant member.
Figure 4:
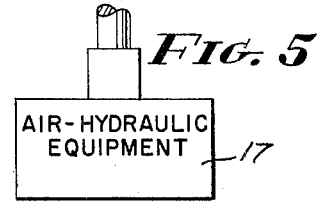
FIG. 4 is a further enlarged, fragmentary, sectional view taken through 4—4 of FIG. 2.
Figure 6:
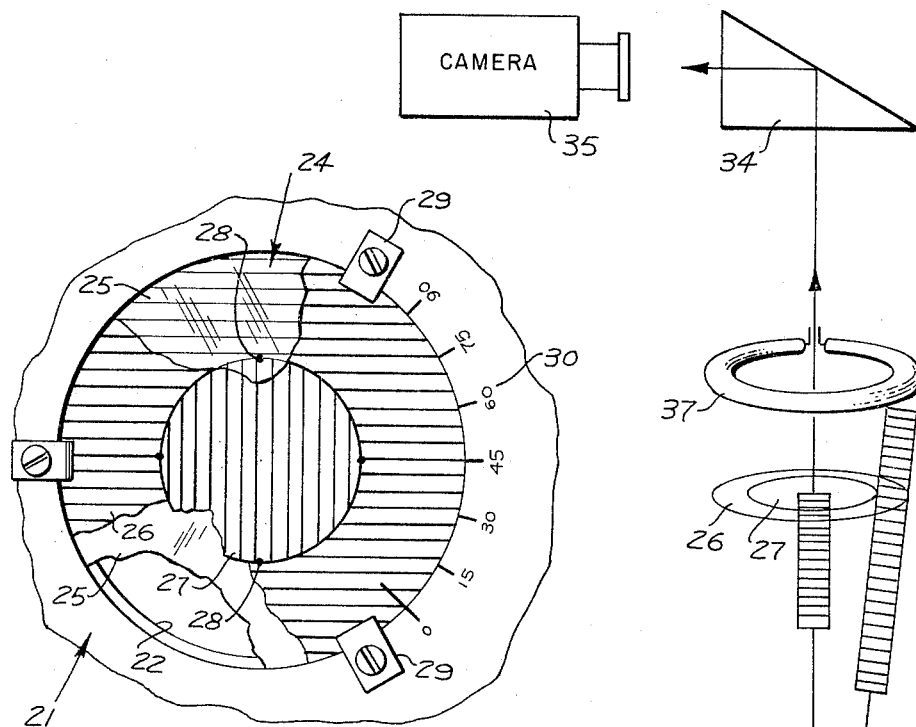
FIG. 6 is an enlarged, plan view of one of the filter units taken substantially from 6—6 of FIG. 4.
Figure 7:
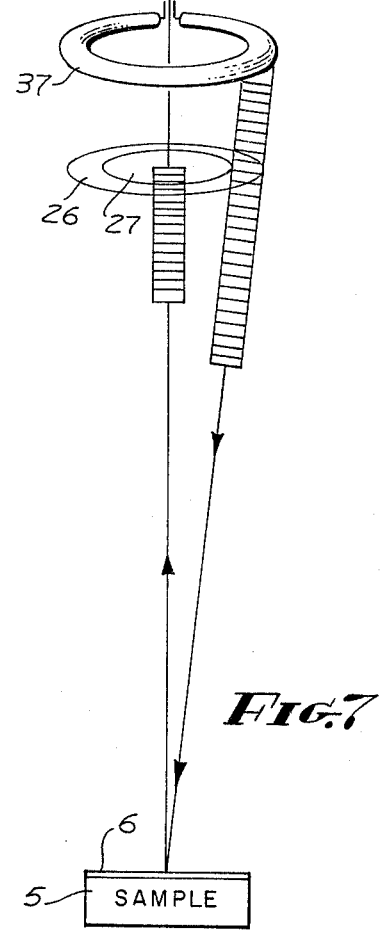
FIG. 7 is a diagrammatical view showing the manner in which light from an annular light source is directed upon the propellant member and reflected to a camera.
Figure 8:
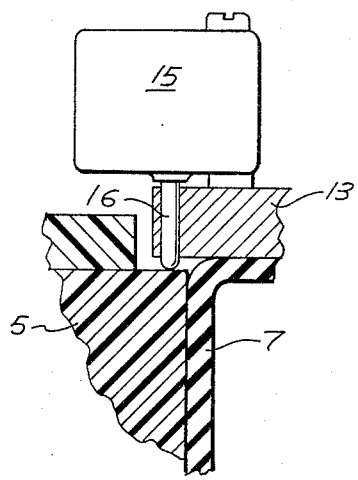
FIG. 8 is a fragmentary, sectional view, showing the upper portion of the propellant grain and switch means for axial control of the pressurizing bag.

The means for strain-analyzing solid propellants includes a supporting structure 1 having a lower platform 2 on which is mounted a sleeve 3, which in turn includes a disk 4. The propellant member 5 to be tested is supported on the disk 4.

The propellant is in the form of a hollow cylinder having relatively thick walls. The bore may be circular or may be star-shaped, or otherwise internally contoured to produce predetermined burning characteristics. For purposes of analyzing strains in the propellant member 5, at least one end is provided with a birefringent coating 6 which conforms to the annular shape of the grain and to the configuration of the bore, whether the bore be annular, star-shaped, or otherwise contoured.

Fitted within the propellant member 5 is a pressurizing bag 7 premolded to fit in substantial conformance with the interior walls of the propellant member 5. The upper and lower ends of the pressurizing bag 7 are constricted to form necks 8 and 9 through which extends a mandrel 10.

The upper neck 8 of the pressurizing bag 7 is secured by clamp means 11 to the upper end of the mandrel 10. The lower end of the pressurizing bag 7 is secured by its neck 9 to the disk 4 by a clamp nut 12 so that the mandrel 10 is capable of axial movement to axially elongate or shorten the pressurizing bag 7.

A portion of the clamp means 11 includes a retainer disk 13 which conforms to the cross sectional contour of the bore in the propellant member 5, and is located in close proximity to, but preferably clearing by a few thousandths of an inch, the upper end of the propellant member 5 so that the pressurizing bag 7 cannot extrude outwardly between the propellant member 5 and the retainer disk 13. The lower end of the pressurizing bag 7 is confined within the boundaries of the propellant grain by a spacer ring 14.

Mounted on the retainer disk 13 is a sensing switch 15 having a probe 16 arranged to lightly engage the end surface of the propellant member 5.

The lower end of the mandrel 10 is connected to a mandrel shifting means 17 which may include a piston and cylinder so that the mandrel 10 may be moved axially a limited distance. Operation of the mandrel shifting means 17 is controlled by the sensing switch 15 so that even though the propellant member 5 may change in axial length when under test, the clearance between the retainer disk 13 and the upper surface of the propellant member 5 will remain substantially constant and be such that the pressurizing bag 7 cannot extrude radially.

The mandrel 10 is provided with a pressurizing fluid passage 18 connected with a source of pressurizing fluid. With the arrangement thus described the propellant member 5 may be uniformly pressurized throughout its axial length in a manner analogous to the pressures created within the propellant when the propellant is ignited in a rocket motor. It should be observed that, when the propellant member 5 is expanded radially by the force exerted through the pressurizing bag 7, a corresponding axial shrinkage occurs, making desirable the axial compensation afforded by the mandrel shifting means 17 and the sensing switch 15. By this arrangement strains developed in the propellant are limited essentially to radial loads uninfluenced by any force exerted by the retainer disk 13 or by extrusion of the bag 7.

The supporting structure 1 is provided with an upper platform 19 on which is mounted a cylindrical filter housing 20 in which is mounted a turntable 21. Formed in the turntable 21 is a circle of apertures 22 which may be moved, one at a time, into axial alignment with the propellant member 5 and exposed thereto through a tubular opening 23.

Each aperture 22 receives a filter unit 24. Each filter unit 24 includes a pair of glass disks 25 between which is positioned a filtering element. The filtering element may be a monochromatic filter or may be a polarizing filter. In the latter case, illustrated in the drawings, the polarizing filter includes a polarizing filter ring 26 and a central, coaxial, polarizing filter disk 27.

The polarizing ring 26 and filter disk 27 are suitably bonded, as indicated by 28, so as to secure the disk 27 and ring 26 with their polarizing axes in predetermined angular relation. The entire filter unit 24 is adjustably secured by clamps 29 so that filter unit 24 may be oriented in different positions; and to aid in positioning the filter unit, a scale 30 is provided at the margin of each aperture 22.

The turntable 21 is provided with a central drive shaft 31 which is driven by a gear reduction and index unit 32, preferably arranged so that the apertures 22 and the filter units 24 may be brought, in predetermined sequence, into axial alignment with the propellant member 5.

Mounted above the opening 23 with which the apertures 22 are aligned, is a prism support 33 containing prisms 34 so arranged that light reflected from the coating 6, and coaxial with the opening 23 and apertures 22 in registry therewith, will be directed at right angles to a camera 35. Below the prisms 34 and carried by the support 33 is an annular lamp frame 36 which contains an annular lamp 37, such as a xenon lamp, for directing light onto the coating 6.

The method of strain-analyzing the solid propellant is as follows:

The solid propellant is provided with a birefringent coating 6 which in itself is conventional. The propellant is then pressurized, for example, by means of the pressurizing bag 7, to a predetermined pressure or predetermined range of pressures. Illumination from the annular lamp 37 is directed axially toward the birefringent coating and is reflected upwardly from the coating through the annular lamp 37 and prisms 34 to the camera 35.

The light in passing from the lamp 37 to the camera 35 is caused to pass through a filter which may be a monochromatic filter or may be a polarizing filter. In the latter case, the light passing from the lamp 37 to the birefringent coating passes through an annular polarizing filter and then returns through a central filter, properly oriented with respect to the first filter, and then passes to the camera 35.

For a complete analysis of the propellant, it is desirable that a set of photographs of the isoclinics (0 to 90 degress) be taken in rapid succession of the pattern appearing on the birefringent coating, and that the orientation of the polarizing filter with respect to the birefringent coating be altered in predetermined amounts. This is accomplished by the turntable 21 which carries a plurality of filter units 24 in predetermined different orientations.

The resulting photographs bear patterns which are uniquely related to the strains (defined by the theory of photoelasticity) existing in the propellant so that the existence of anomalies in the propellant grain may be readily detected, and in general it may be readily determined whether or not the propellant meets a safe standard.

More specifically, by taking measurements at various time intervals, strain and stress measurements as a function of time are obtained. Two pertinent tests in the study of viscoelastic physical properties are (1) the creep test and (2) the relaxation test. The creep test is accomplished by maintaining the bag pressure constant (hence the stresses in the rocket grain) and observing the strain field as a function of time. The relaxation test is accomplished by maintaining the isochromatic pattern constant (strain magnitudes) and observing the stress field decay by monitoring the pressure drop in the bag.

Dynamic studies can be either cyclical or transient. The cyclical is accomplished by cycling the bag pressure whereas the transient is accomplished by either increasing or decreasing the bag pressure monotonically.

The sequence of events may be accomplished manually; however, it is preferred to utilize a conventional automatic timing means to cause operation of the camera and notation of the turntable at predetermined intervals.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A method of testing a viscoelastic tubular solid propellant member, characterized by:
    (a) coating at least one end of a tubular solid propellant member with a birefringent resin;
    (b) sealing the ends of said propellant member internally of said birefringent resin whereby said resin is exposed;
    (c) subjecting the tubular propellant member to internal pressures;
    (d) exposing the coating to polarized light
    (e) and photographing the strain pattern produced by said coating.

2. A method of testing a viscoelastic tubular solid propellant member, characterized by:
    (a) coating at least one end of a tubular solid propellant member with a birefringent resin;
    (b) sealing the ends of said propellant member;
    (c) subjecting the tubular propellant member to internal pressures;
    (d) exposing the coating to polarized light;
    (e) changing the orientation of the polarized light;
    (f) and photographing the strain pattern produced by said coating for each orientation of the polarized light.

3. A means of testing a viscoelastic tubular solid propellant member, comprising:
    (a) means for closing the extremities of the bore of a tubular solid propellant member having a birefringent coating on one axial end while exposing said coating;
    (b) means for internally pressurizing said tubular propellant member;
    (c) means for exposing said coating to polarized light;
    (d) and coaxially disposed means for receiving polarized light from said coating.

4. A means of testing a viscoelastic tubular solid propellant member, comprising:
    (a) means for closing the extremities of the bore of a tubular solid propellant member having a birefringent coating on one axial end while exposing said coating;
    (b) means for internally pressurizing said tubular propellant member;
    (c) an annular source of light directed axially onto said coating;
    (d) means disposed coaxially with respect to said light source for receiving reflected light from said coating passing through said annular source;
    (e) concentric light polarizing means disposed in the paths of incident and reflected light to and from said coating;
    (f) and a camera for photographing said reflected light.

5. A means of testing a viscoelastic tubular solid propellant member, comprising:
    (a) means for closing the ends of a tubular solid propellant member having a birefringent coating on one axial end;
    (b) means for internally pressurizing said tubular propellant member;

(c) an annular source of light directed axially onto said coating;
(d) means disposed coaxially with respect to said light source for receiving reflected light from said coating passing through said annular source;
(e) a plurality of concentric pairs of polarizing elements;
(f) means for moving said elements in sequence between said light source and said coating whereby the light incident to and reflected from said coating passes through said polarizing elements;
(g) and a camera for photographing light passing through said polarizing elements.

6. A means for testing a viscoelastic tubular solid propellant member having a birefringent coating on an end thereof, comprising:
(a) a support for said propellant member;
(b) an inflatable bag within the bore of said propellant member;
(c) means for inflating said bag to introduce strain in the propellant member;
(d) an annular source of light directed axially onto said coating;
(e) concentric light polarizing means disposed in the paths of incident and reflected light to and from said coating;
(f) and a camera for photographing said reflected light.

7. A means for testing a viscoelastic tubular solid propellant member having a birefringent coating on an end thereof, comprising:
(a) a support for said propellant member;
(b) an inflatable bag within the bore of said propellant member;
(c) means for inflating said bag to introduce strain in the propellant member;
(d) an annular source of light directed axially onto said coating;
(e) a plurality of concentric pairs of polarizing elements oriented in different directions;
(f) means for moving said elements in sequence between said light source and said coating whereby the light incident to and reflected from said coating passes through said polarizing elements;
(g) and a camera for photographing light passing through said polarizing elements.

8. Apparatus for supporting a viscoelastic tubular propellant member while undergoing test, comprising:
(a) an inflatable bag dimensioned to fit within said propellant member;
(b) means for inflating said bag;
(c) means for axially restraining said bag, including a disk conforming to the dimensions of the opening in said propellant member whereby the end of said propellant member surrounding said disk is exposed;
(d) means for sensing change in axial dimension of said propellant member when subjected to internal pressure exerted by said bag;
(e) and means controlled by said sensing means for moving said disk axially to compensate for axial movement of said propellant member and maintain said disk in a predetermined contiguous relation with said propellant member thereby to prevent extrusion of said bag between said disk and propellant and restrict the force exerted by said bag on said propellant to radial directions.

References Cited by the Examiner
UNITED STATES PATENTS

| | | | |
|---|---|---|---|
| 2,170,959 | 8/1939 | Bartels | 88—65 |
| 2,578,031 | 12/1951 | Aubrey et al. | 73—37 X |
| 3,034,341 | 5/1962 | Golubovic | 73—188 |
| 3,082,664 | 3/1963 | Acloque | 88—65 X |
| 3,203,229 | 8/1965 | Pevar | 73—88 X |

OTHER REFERENCES

McMaster: Nondestructive Testing Handbook, vol. II, sec. 53, page 11, 1959.

RICHARD C. QUEISSER, *Primary Examiner.*

G. M. GRON, J. J. SMITH, *Assistant Examiners.*